United States Patent [19]

Bloomfield et al.

[11] Patent Number: 5,559,948
[45] Date of Patent: Sep. 24, 1996

[54] APPARATUS AND METHOD FOR MANIPULATING AN OBJECT IN A COMPUTER SYSTEM GRAPHICAL USER INTERFACE

[75] Inventors: Marc A. Bloomfield, Lighthouse Point, Fla.; Christopher A. H. Andrew, Orem, Utah; Peter G. Magid, Boca Raton, Fla.

[73] Assignee: International Business Machines Corporation, Armonk, N.Y.

[21] Appl. No.: 408,334

[22] Filed: Mar. 22, 1995

Related U.S. Application Data

[63] Continuation of Ser. No. 263,906, Jun. 22, 1994, abandoned, which is a continuation of Ser. No. 993,875, Dec. 23, 1992, abandoned.

[51] Int. Cl.$^6$ .................................................. G06F 3/153
[52] U.S. Cl. .......................................... 395/159; 395/157
[58] Field of Search ................................ 395/155, 159, 395/161; 364/222.8; 345/117

[56] References Cited

U.S. PATENT DOCUMENTS 5,021,976   6/1991   Wexelblat et al. ................... 395/159 X

OTHER PUBLICATIONS

Microsoft Windows User's Guide (Trademark of Microsoft Cor.) pp. X, 25, 88–91, 145–193, ibid 1990, pp. 131–132.

*Primary Examiner*—Heather R. Herndon
*Assistant Examiner*—Cliff N. Vo
*Attorney, Agent, or Firm*—Bruce D. Jobse; Duke W. Yee; Andrew J. Dillon

[57] ABSTRACT

A graphical user interface, executable on a computer system, includes a first user-selectable icon, displayable on the computer system and representing an object having desired properties within the computer system. A second user-selectable icon, also displayable on the computer system, appears visually distinguishable from the first icon and likewise represents the same object. The second icon has associated therewith at least one of user-selectable command, which enables manipulation of the properties of the object upon selection thereof. The second icon may be located remotely from the first icon on the graphical user interface to provide for convenient manipulation of the object properties without having to access the first icon repeatedly.

3 Claims, 7 Drawing Sheets

APPARATUS AND METHOD FOR MANIPULATING AN OBJECT IN A COMPUTER SYSTEM GRAPHICAL USER INTERFACE

This is a continuation of application Ser. No. 08/263,906, filed Jun. 22, 1994, now abandoned, which is a continuation of application Ser. No. 07/993,875, filed Dec. 23, 1992, now abandoned.

The present patent application is one of a group of copending U.S. patent applications which concern the same overall personal computer system but which individually claim different inventive concepts embodied in such personal computer system. These related patent applications were filed on Mar. 20, 1992 unless indicated otherwise and are specifically incorporated in their entirety by reference herein, and are more particularly described as follows:

(1) Application Ser. No. 07/854,171, entitled "Method for Providing Conditional Cascading in a Computer System", the inventors being Bloomfield et al, now U.S. Pat. No. 5,425,140;

(2) Application Ser. No. 07/854,257, entitled "Method for Providing Size Adjustment for a Maximized Window in a Computer System Graphical User Interface", the inventor being Bloomfield;

(3) Application Ser. No. 07/855,369 entitled "Palette Manager in a Graphical User Interface Computer System", the inventors being Bloomfield et al., now U.S. Pat. No. 5,371,844;

(4) Application Ser. No. 07/855,366 entitled "Method for Providing a Readily Distinguishable Template and Means of Duplication Thereof in a Computer System Graphical User Interface", the inventor being Bloomfield, et al., now abandoned;

(5) Application Ser. No. 07/996,422 entitled "Method of Transferring Programs from Action Oriented GUI Paradigm to Object GUI Paradigm", the inventor being Bloomfield, filed herewith on Dec. 23, 1992, now abandoned;

(6) Application Ser. No. 07/996,983 entitled "User-Modifiable Popup Menus for Object Oriented Behavior", the inventor being Bloomfield, filed herewith on Dec. 23, 1992, now U.S. Pat. No. 5,345,550, and (7) application Ser. No. 07/996,223 entitled "Method of Generating a Hierarchical Window List in a Graphical User Interface", the inventors being Bloomfield et al., filed herewith on Dec. 22, 1992, now U.S. Pat. No. 5,412,776.

FIELD OF THE INVENTION

This invention relates to personal computer systems and in particular to a method and device for improving a graphical user interface (GUI) on a personal computer system.

BACKGROUND DISCUSSION

Personal computer systems in general and IBM personal computers, in particular, have attained widespread use for providing computer power to many segments of today's modern society. Personal computer systems can usually be defined as a desktop, floor standing, or portable microcomputer that consists of a system unit having a single system processor, a display monitor, a keyboard, one or more diskette drives, a fixed disk storage, and an optional printer. Once of the distinguishing characteristics of these systems is the use of a motherboard or system planar to electrically connect these components together. These systems are designed primarily to give independent computing power to a single user and are inexpensively priced for purchase by individuals or small businesses.

Examples of such personal computer systems are IBM's PERSONAL COMPUTER AT, IBM's PERSONAL SYSTEM/2 Models 25, 30, 35, 40 SX, 55 SX, 57 SX, 70, 80, 90 and 95, and IBM PERSONAL SYSTEM/1 computers. These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 55 SX through 95. Beginning with the earliest personal computer system of the Family I models, such as the IBM Personal Computer, it was recognized that the operating system would be of utmost importance. Realizing that market acceptance was a primary goal, IBM chose a rather simple text oriented operating system which was suited for the level of hardware technology of the time. The operating system chosen was named DOS which is the acronym for disk operating system. The limited objectives for DOS at the time were non-cryptic commands, English language error messages (instead of error codes), small memory size (12 Kbyte) and reasonable performance. DOS served well for the Family I machines and even into the basic Family II models, but as memory and hardware prices declined and performance increased a more user friendly intuitive operating system was needed. Beginning in 1986, IBM started development of a graphical user interface (GUI) designed to mask the complexity of the hardware technology advances and present to the user an intuitive, flexible, and easy-to-use system. This operating system was named OS/2 and was developed for the more advanced technology of the Family II models.

Additionally, other manufacturers have investigated and used other types of GUI systems. One of the earliest in the personal computing area was Xerox's STAR system that presented the user with icons representing a particular operation or software application. Later, APPLE's Macintosh system added features such as windows and drag and drop to further the intuitive nature of the graphical user interface for APPLE's line of computers. Presently, MICROSOFT's WINDOWS provides a graphical user interface on IBM compatible machines.

With GUI systems, the computer system is controlled using a pointing device such as a mouse. The pointing device controls the location of a pointer that appears on the screen of the computer's display device. Elements on the screen such a icons., which are graphical representations of various objects such as disk drives, applications, or documents, and windows, which are rectangular areas on the screen in which applications or documents can be viewed, may be manipulated using the mouse. In this way, the graphical user interface provides a more intuitive facility for interacting with the computer operating system than the conventional command-line interface. The icons and windows of the GUI serve as references or pointers to the data or system resources and enable the user to interface with the computer in a simpler, logical manner which mimics the real world.

As GUI systems developed, producing the underlying element such as windows and icons has become well known. In fact, publicly available tools such as icon and window editors are now available to actually create the visual display. For example, Conklin, OS/2 Notebook, (Microsoft Press, 1990) pp. 159–255 discusses OS/2 software tools.

As new models of the personal computer family were introduced, OS/2 had to be updated and enhanced. One of the major features of the OS/2 Version 2.0 operating system in which the present invention is incorporated is a workplace shell featuring a desktop metaphor. Briefly, the desktop metaphor presents the user with the look of a desktop. For example, files can appear as icons grouped together into folders. Folders can be placed into a predefined space such as a window. Application programs appear as unique icons that can be activated when a pointer positioned by the movement of a mouse over the icon, is energized usually by double clicking one of the mouse buttons.

The OS/2 operating system, as well as other GUI systems, allow for surrogates of object icons to be made and located throughout different areas of the graphical user interface, such as folders or, in the case of OS/2, the desktop metaphor. In this way, if the user wishes to manipulate the resource or data represented by the object icon or to send data to the object icon, such as in the case of a printer or disk drive, the user need only access the surrogate icon to perform the desired function, without having to locate the original icon. This is most beneficial, particularly in an environment where several windows, and/or files may be opened simultaneously in different locations on the graphical user interface. The surrogate icons serve as pointers or links to the original object icon where the data or system resources are actually stored.

In graphical user interfaces, the surrogate and the original icon can have the same visual appearance, causing confusion with the user as to where the data and/or system resource is actually located. Accordingly, a need exists for a way to visually distinguish between surrogate icons and the original object icon in the graphical user interface of a computer system.

In addition, it is often desirable to access and manipulate the original object and the properties thereof, from the surrogate icon, without having to actually locate and access the original object icon. Accordingly, a need further exists for the means by which the original icon and the object properties thereof can be accessed and manipulated through a surrogate icon on the graphical user interface of a computer system.

A graphical user interface is proposed herein in which object icons and surrogate icons representing the same object are visually distinguishable and which further provides the user with the capability of manipulating and accessing the properties of the original object from a surrogate icon of the original.

SUMMARY OF THE INVENTION

The foregoing and other objects of the present invention are achieved according to a first embodiment of the present invention, with a graphical user interface executable on a computer system. The graphical user interface comprises a first user-selectable icon displayable on the computer system and representing an object having desired properties. A second user-selectable icon, likewise displayable on the computer system, and visually different from the first icon, also represents the object. Associated with the second icon is at least one user-selectable command, which enables manipulation of the desired properties of the object. The graphical user interface further comprises means, responsive to selection of the second icon, and the command manipulating the properties of the object in response to selection of the command.

According to a second aspect of the present invention, a method of accessing and manipulating the properties of an object in a computer system graphical user interface comprises the steps of:

providing an object having desired properties on the computer system, one of said desired properties including a displayable first icon representation of the object;

creating a displayable surrogate icon, visually different from the first icon, said object;

providing at least one user-selectable command associated with said second icon upon at least one said command enabling manipulation of the properties of said object upon selection; and manipulating the properties of the object in response to user selection of said command.

The invention will be more fully understood from the detailed description set forth below which should be read in conjunction with the accompanying drawings, the invention is defined in the claims appended at the end of the detailed description which is offered by way of example only.

BRIEF DESCRIPTION OF THE DRAWINGS

The foreground aspects and other features of the present invention are explained in the following written description, taken in connection with the accompanying drawings, wherein.

DESCRIPTION OF A PREFERRED EMBODIMENT

The following detailed description is of the best presently contemplated mode for carrying out the invention. This description is not to be taken in a limiting sense but is made merely for the purpose of illustrating the general principles of the invention since the scope of the invention is best defined by the appended claims.

I. Operation of the Computer System—General

Figure 1:
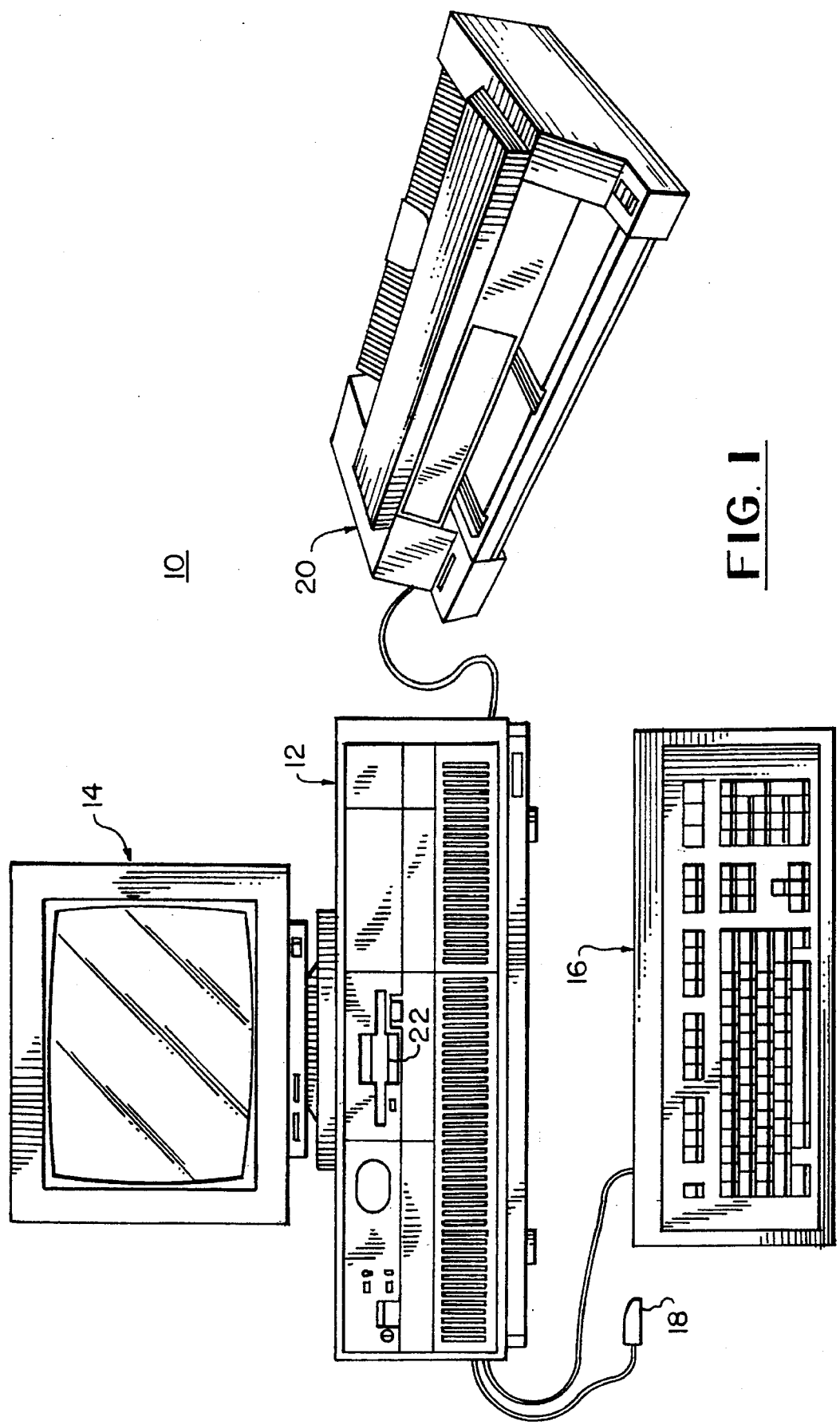
FIG. 1 shows a personal computer system in which the present invention can be employed.

Prior to relating the methodology and structure of the present invention, a summary of the operation in general of a typical personal computer system is described below. Referring now to the drawings, and in particular to FIG. 1, there is shown a Personal computer System 10 in which the present invention can be employed. As shown, the Personal Computer System 10 comprises a number of components which are interconnected together. More particularly, a system unit 12 is coupled to and can drive an optional monitor 14 (such as a conventional video display). A system unit 12 can also be optionally coupled to input devices such as a PC keyboard 16 or a mouse 18. Mouse 18 includes right and left buttons (not shown). The left button is generally employed as the main selector button and is alternatively referred to as the first mouse button or mouse button 1. The right button is typically employed to select auxiliary functions as explained later. The right mouse button is alternatively referred to as the second mouse button or mouse button 2. An Optional output device such as a printer 20 can also be connected to the system unit 12. Finally the system unit 12 may include one or more mass storage devices such as the diskette drive 22.

As will be described below, the system unit 12 responds to input devices such as the PC keyboard 16, the mouse 18, or local area networking interfaces. Additionally, input/output devices, such as the diskette drive 22, display 14, printer 20, and local area network communication system are connected to the system unit 12 in a manner well known. Of course, those skilled in the art are aware that other conventional components can also be connected to the system unit 12 for interaction therewith. In accordance with the present invention, the computer system 10 includes a system processor that is interconnected to a random access memory (RAM) a read only memory (ROM), and a plurality of I/O devices.

In normal use, the personal computer system can be designed to give independent commuting power to a small group of users as a server or a single user and is expensively priced for purchase by individuals or small businesses. In operation, the system processor functions under an operating system, such as IBM's OS/2 operating system or the DOS Operating System. This type of operating system includes a BIOS interface between the I/O devices and the operating system. BIOS, which can be stored in a ROM on a motherboard or planar, includes diagnostic routines which are contained in a power on self test section referred to as POST.

II. Operation of the Computer System—In More Detail

Figure 2:
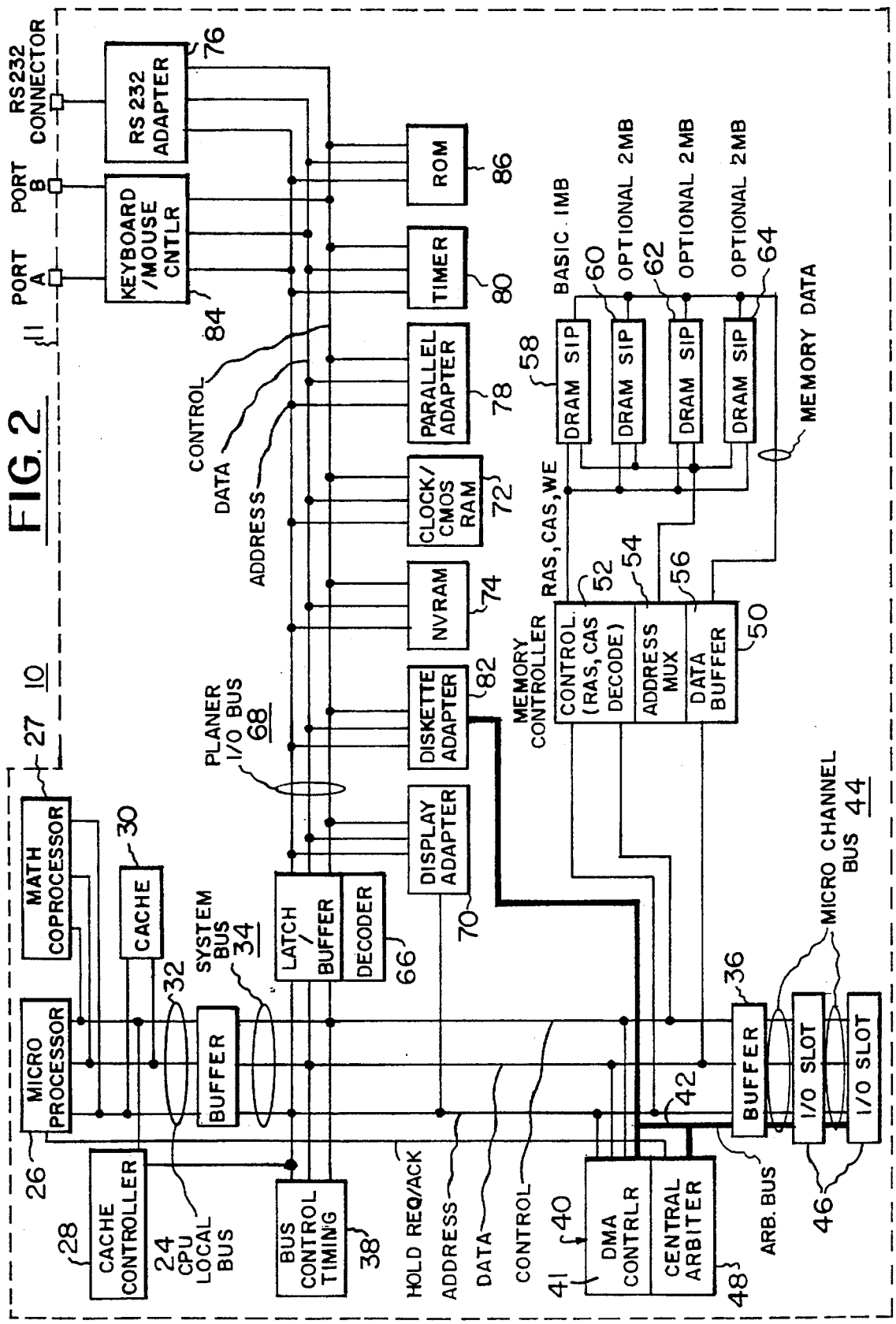
FIG. 2 shows a system block diagram for the personal computer system of FIG. 2.

Prior to relating the above structure to the present invention, a summary of the operation, in general, of the personal computer system 10 is described below. Referring to FIG. 2, there is shown a block diagram of the personal computer system 10 illustrating the various components of the computer system 10 in accordance with the present invention. FIG. 2 further illustrates components of the planar 11 and the connection of the planar to the I/O slots 46 and other hardware of the personal computer system 10. Connected to the planar 11 is the system processor 26 comprising a microprocessor which is connected by a high speed CPU local bus 24 through a bus controlled timing unit 38. Bus 24 is coupled to memory control unit 50 which is further connected to a volatile random access memory (RAM) 58. While any appropriate microprocessor can be used, one suitable microprocessor is the 80486 which is sold by Intel.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286 or 80386 microprocessor.

Figure 4:
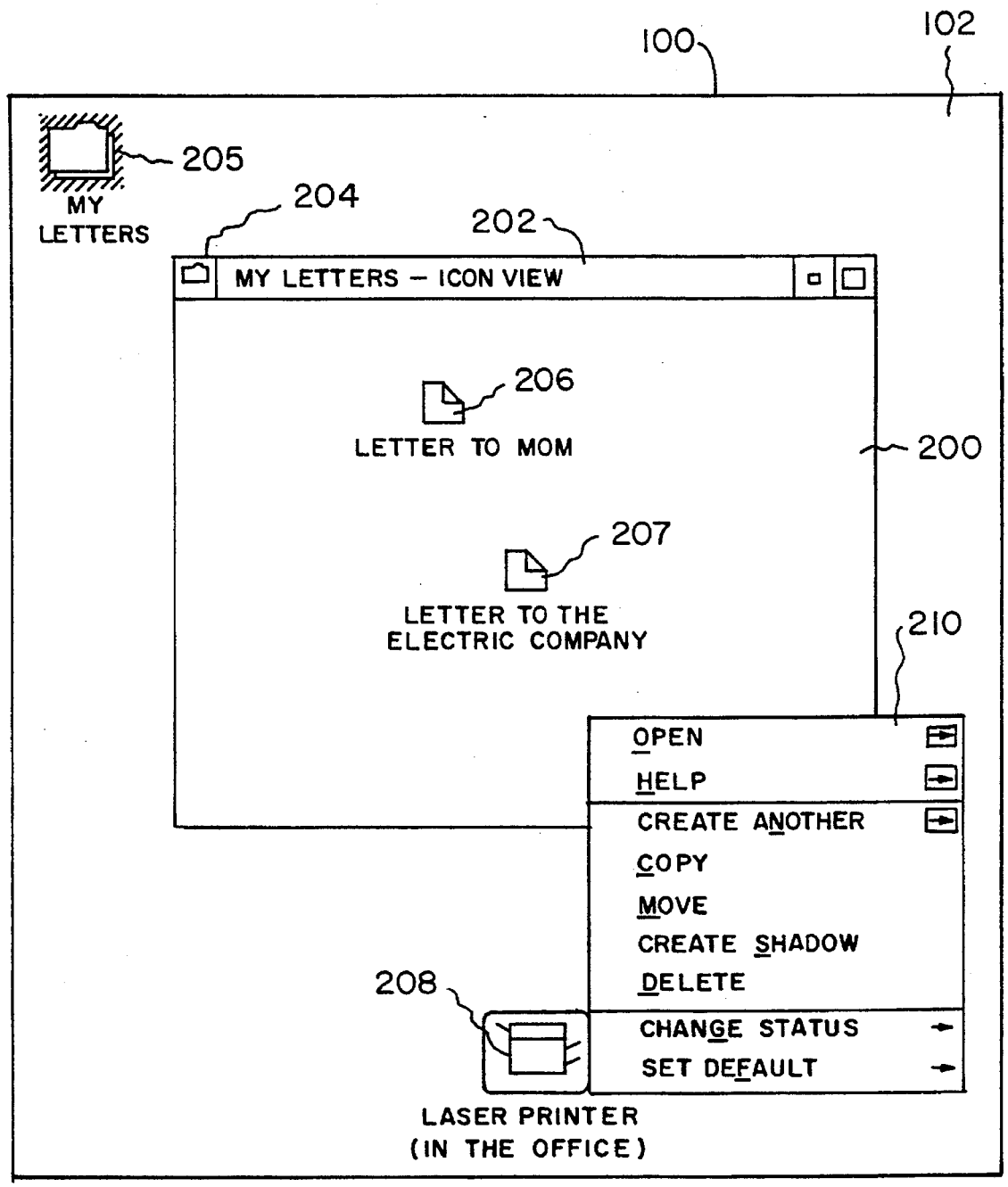
FIG. 4 is a screen representation of an original object icon and the menu options associated therewith.

Returning now to FIG. 2, the CPU local bus 24 (comprising data, address and control components) provides for the connection of a microprocessor 26, an optional math coprocessor 27, a cache controller 28, and a cache memory 30. Also coupled on the CPU local bus 24 is a buffer 32. The buffer 32 is itself connected to a slower speed (compared to the CPU local bus) system bus 34, also comprising address, data and control components. The system bus 34 extends between the buffer 32 and a further buffer 36. The system bus 34 is further connected to a bus control and timing unit 38 and a DMA unit 40. The DMA unit 40 comprises a central arbitration unit 48 and a DMA controller 41. The buffer 36 provides an interface between the system bus 34 and an optional feature bus such as the Micro Channel bus 44. Connected to the bus 44 are a plurality of I/O slots 46 for receiving Micro Channel adapter cards which may be further connected to an I/O device or memory. An arbitration control bus 42 couples the DMA controller 41 and central arbitration unit 48 to the I/O slots 46 and diskette adapter 82. Also connected to system bus 34 is a memory control unit 50 which comprises a memory controller 52, an address multiplexer 54, and a data buffer 56. The memory control unit 50 is further connected to a random access memory as represented by the RAM module 58. The memory controller 52 includes logic for mapping addresses to and from system 10 and is shown with a basic 1 megabyte RAM module. It is understood that additional memory can be interconnected as represented in FIG. 4 by the optional memory modules 60 through 64.

An additional buffer 66 is coupled between the system bus 34 and a planar bus 68. Planar I/O bus 68 includes address, data, and control components, respectively. Coupled along planar bus 68 are a variety of I/O adapters and other peripheral components such as display adapter 70 (which is used to drive an optional display 14), clock 72, nonvolatile RAM 74 (hereinafter referred to as NVRAM, RS232 adapter 76, parallel adapter 78, plurality of timers 80, diskette adapter 82, PC keyboard/mouse controller 84, and a read only memory (ROM) 86. ROM 86 includes BIOS which provides the user transparent communications between I/O devices.

Clock 72 is used for time of day calculations. NVRAM 74 is used to store data which describes the present configuration of the system. For example, NVRAM contains information which describe the capacity of a fixed disk or diskette, the type of display, the amount of memory, etc. Of particular importance, NVRAM will contain data which is used to describe the system console configuration, i.e. whether the PC keyboard is connected to the keyboard/mouse controller 84 or whether the ASCII terminal is connected to the RS232 adapter 76.

Parts A and B are to keyboard/mouse controller 84. These ports are used to connect a PC keyboard (as opposed to an ASCII terminal) and mouse to the PC system. Coupled to RS232 adapter unit 76 is an RS232 connector to which an optional ASCII terminal can be coupled to the system.

III. OS/2 Version 2 Operating System—General

Figure 3:
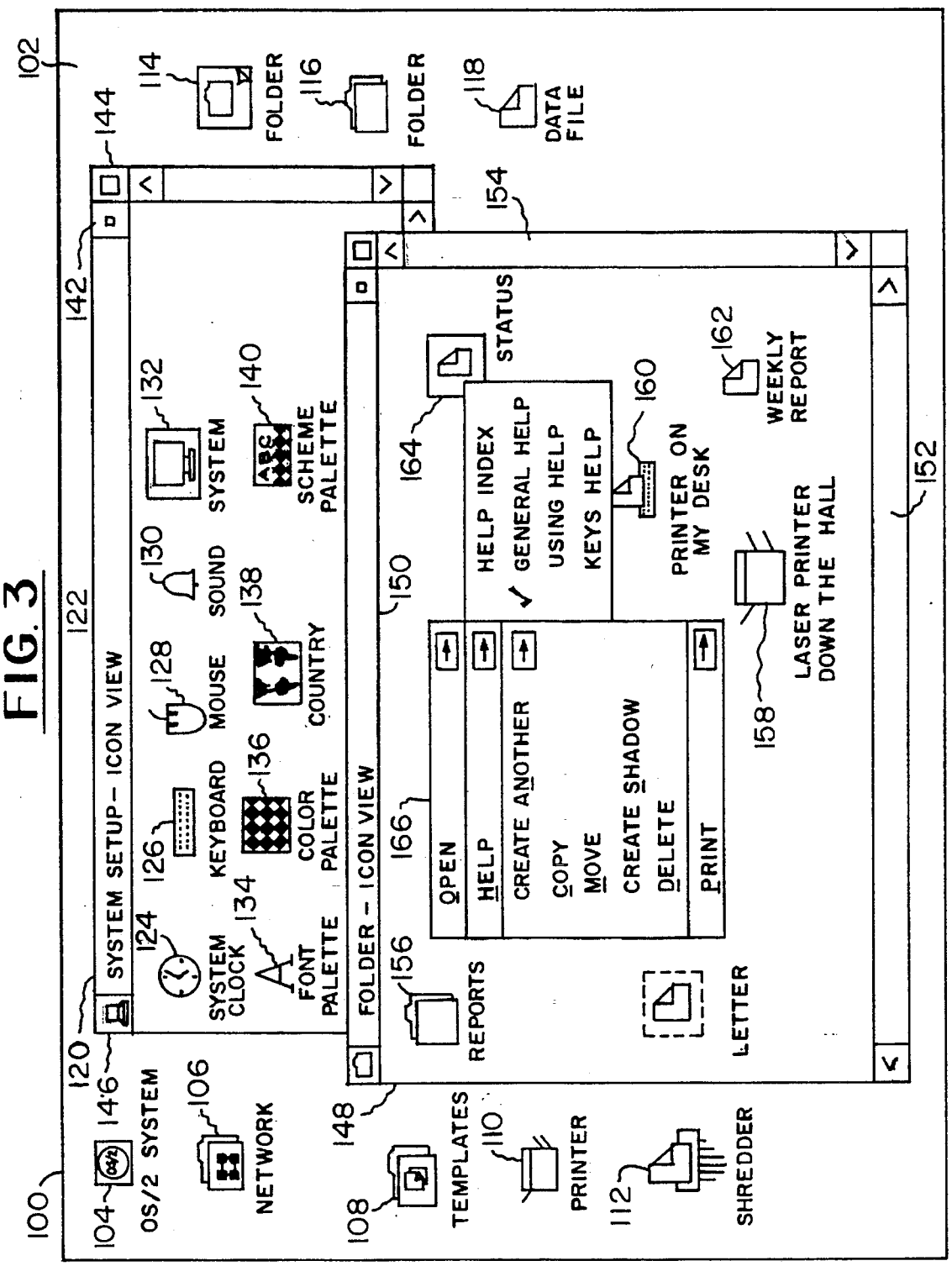
FIG. 3 is a screen representation of the graphic user interface employed in the present invention.

FIG. 3 illustrates a typical display screen 100 which appears when using OS/2.0. The viewing area within screen 100 is referred to as desktop 102. Desktop 102 includes a plurality of user selectable icons which are selected by double clicking the left button of the mouse. Each icon represents an application., function, file storage area or system resource which the user can select. For example, as seen in FIG. 3, desktop 102 includes the OS/2 System icon 104, Network icon 106, Templates icon 108, Printer icon 110, Shredder icon 112, Folder icons 114 and Folder icon 116 and Data file 118.

When the user selects an icon by double clicking the same, the corresponding function is activated and the icon becomes highlighted. For example, when the OS/2 System icon 104 is selected on desktop 102, the icon becomes highlighted, as illustrated in FIG. 3. When the OS/2 System icon 102 is selected, a corresponding window 120 of further possible selections is displayed on desktop 102. More specifically, window 120 includes a title bar 122 in which the name of the selected window is designated in text as "System Setup—Icon view." In this particular example, the selectable icons appearing within System Startup window 120 includes System Clock icon 124, Keyboard icon 126, Mouse icon 128, Sound icon 130, System icon 132, Font Palette icon 134, Color Palette 136, Country icon 138 and Scheme Palette 140.

The upper right corner of window 120 includes a small box 142 which, if selected by the user, minimizes window 120, thus dismissing window 120 and returning window 120 to the icon 104 representation thereof. The upper right corner of window 120 also includes a box 144, larger than box 142 and which if selected by the user, maximizes window 120, thus causing window 120 to occupy substantially all of the desktop 102.

The icon representation 146 appearing in the upper left corner indicates the type of window to which it corresponds. For example, window 120 is a system setup window. Accordingly, the icon appearing in the upper left corner of window 120 is representative of the System icon. Had System Clock icon 124 been selected, the icon appearing in the upper left corner of its window would be representative of a clock.

Since title bar 122 of window 120 is depicted in white or "not highlighted", this indicates the window 120 is not presently selected or active. Rather the user has clicked on and selected Folder 114, as indicated by its highlighted nature. When Folder 114 was selected, a corresponding Folder window 148 was opened on desktop 102 in overlapping fashion with respect to the earlier opened System Setup window 120. The title bar 150 of window 148 indicates the title of window 148 as being "Folder-Icon View". It is noted that title bar 150 of window 148 is highlighted, thus indicating that window 148 is presently the active window.

Window 148 includes a horizontal scroll bar 152 which can be engaged by the user to scroll through the contents of window 148 from left to right and from right to left all within the particular viewing area defined by the chosen dimensions of window 148. Window 148 also includes a vertical scroll bar for scrolling through the window contents vertically. Other windows generated by the operating system also include this feature. For purposes of example, window 148 includes a Reports icon 156, a Laser Printer Down The Hall icon 158, a Printer On My Desk icon 160, a Weekly Report icon 162 and a Status icon 164.

IV. Original and Surrogate Icons and Their Interaction

FIG. 4 illustrates screen 100 and desktop 102 in the graphical user interface of the OS/2 Operating System. Icon 205 on desktop 100 represents the folder "My Letters" of which window 200 is the icon view. Window 200 includes title bar 202 entitled "My Letter". From the icon 204 appearing in the upper left-hand corner of window 200, it is seen that window 200 represents a folder. Window 200 includes icons 206 and 208 representing data files. A laser printer icon 208 is situated on desktop 100. Icon 208 represents a printer configuration, i.e., a print destination including all properties and attributes that define the destination..

In the context of the present invention, data files and printer configurations are examples of objects. An object is an entity which is stored in the computer system and which is represented by an icon on the desktop. Other examples of objects include color palettes, disk configurations, etc. Each object exhibits certain properties such as the object name, icon, font, selected printer, and text contents. Another property of an object is the application with which it is associated. For example, if the object is a word processing document, it may be associated with a word processing application by which the document was generated. In this manner, when the user opens the word processing document, the operating system has the ability to call the word processing application which generated the document.

For the purposes of discussion, it is assumed that the user has created printer icon 208 and now desires to create one or more surrogate icons representing the same laser printer in various other folders and/or other locations within desktop 102. To create a surrogate icon, the user physically positions the mouse or other pointing device so that the cursor is located over the icon 208. Next, the user opens or single clicks mouse button 2, causing icon 208 to be highlighted and menu 210 to appear, as illustrated in FIG. 4. The specific options displayed on menu 210 depend on the type of object and its particular state. One option of menu 210, "Create Shadow", is present regardless of the object type or state. This option, once selected, enables the user to create a surrogate icon of the original object, as explained hereinafter. All other menu options in menu 210 are not particularly relevant to this discussion and will not be described in detail hereinafter.

Once menu 210 appears, the user, via manipulation of the mouse, moves the cursor over the Create Shadow option and single clicks mouse button 2 causing the operating system to create a surrogate icon 212 of printer icon 208. The user then moves the surrogate icon to the new location, here window 200, and releases mouse button 2. The surrogate icon and the original icon are "linked" through the graphical user interface of the operating system.

Figure 5:
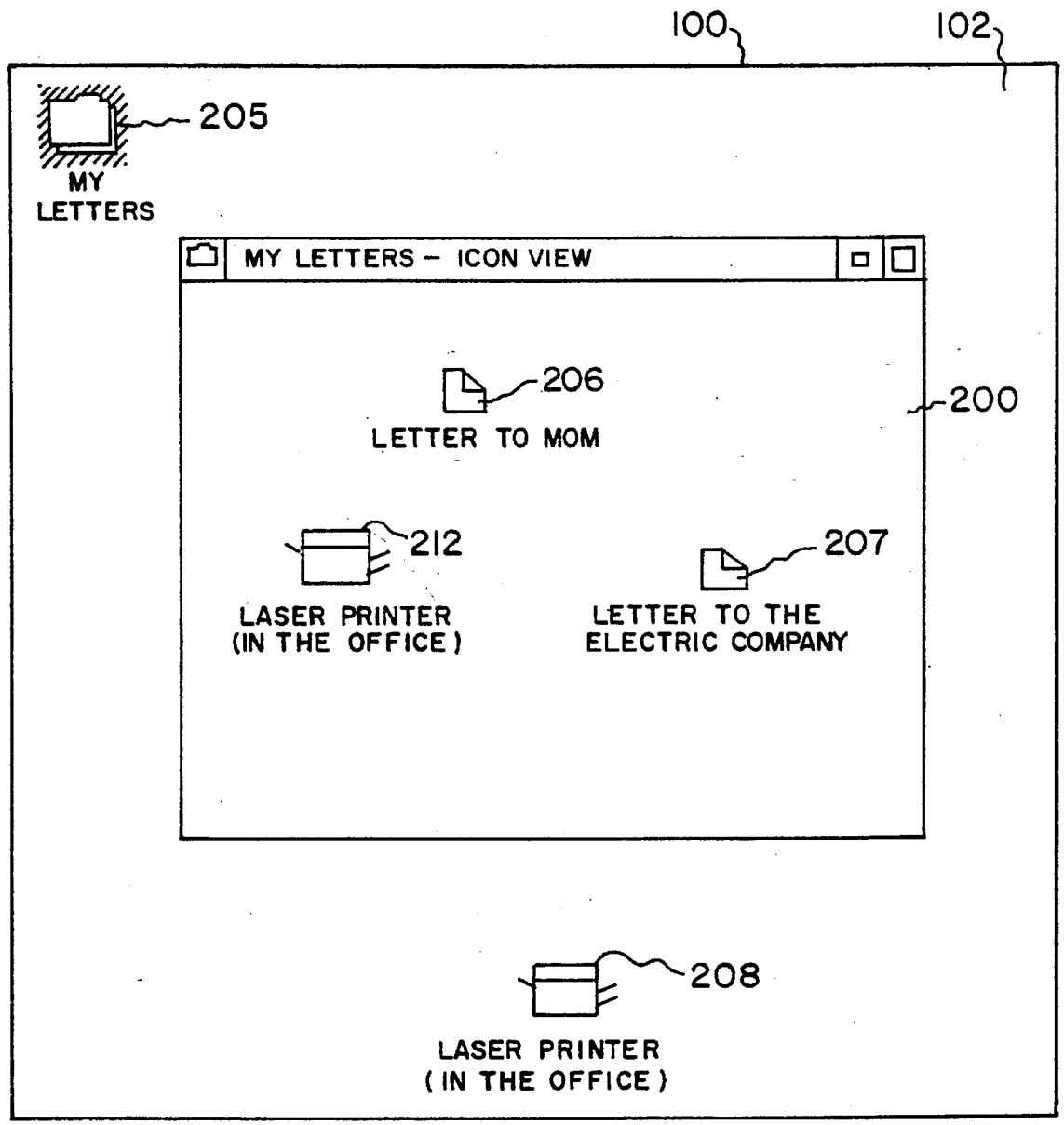
FIG. 5 is a screen representation of an original object icon and a surrogate icon representation of the same object.

FIG. 5 illustrates both original object icon 208 and surrogate icon 212. Surrogate icon 212 is visually different from original icon 208. The legend or text associated with icon 212 has been grayed to give it a visual different appearance than the text associated with icon 208. By greying or shading the text associated with the surrogate icon, the surrogate icon may be easily visually distinguished from the original icon. This visually distinction is useable even where the icon is not visible, for example, in list views or tree-list views of object properties. It will be obvious to those reasonably skilled in the arts that other aspects of an icon may be changed to create the visual distinction between the surrogate icon and the original object icon, such as shading the icon itself or displaying only the outline of the original icon as the surrogate representation. As stated previously, the printer configuration data stays with the original icon 208 with the surrogate icon serving as a reference or link to the original object from a different location within the graphical user interface. In this manner, a user may have numerous surrogate icons of an object within the graphical user interface for the sake of convenience.

In the illustrated example, although there may only be one original object icon representing a laser printer on the graphical user interface, the user may create and place a surrogate icon of such a laser printer in each folder in the graphical user interface. Such a configuration allows the user to conveniently send documents or data to the laser printer by simply dropping the icon of the document onto the surrogate icon of the laser printer, without having to actually locate the original object icon of the laser printer.

Figure 6:
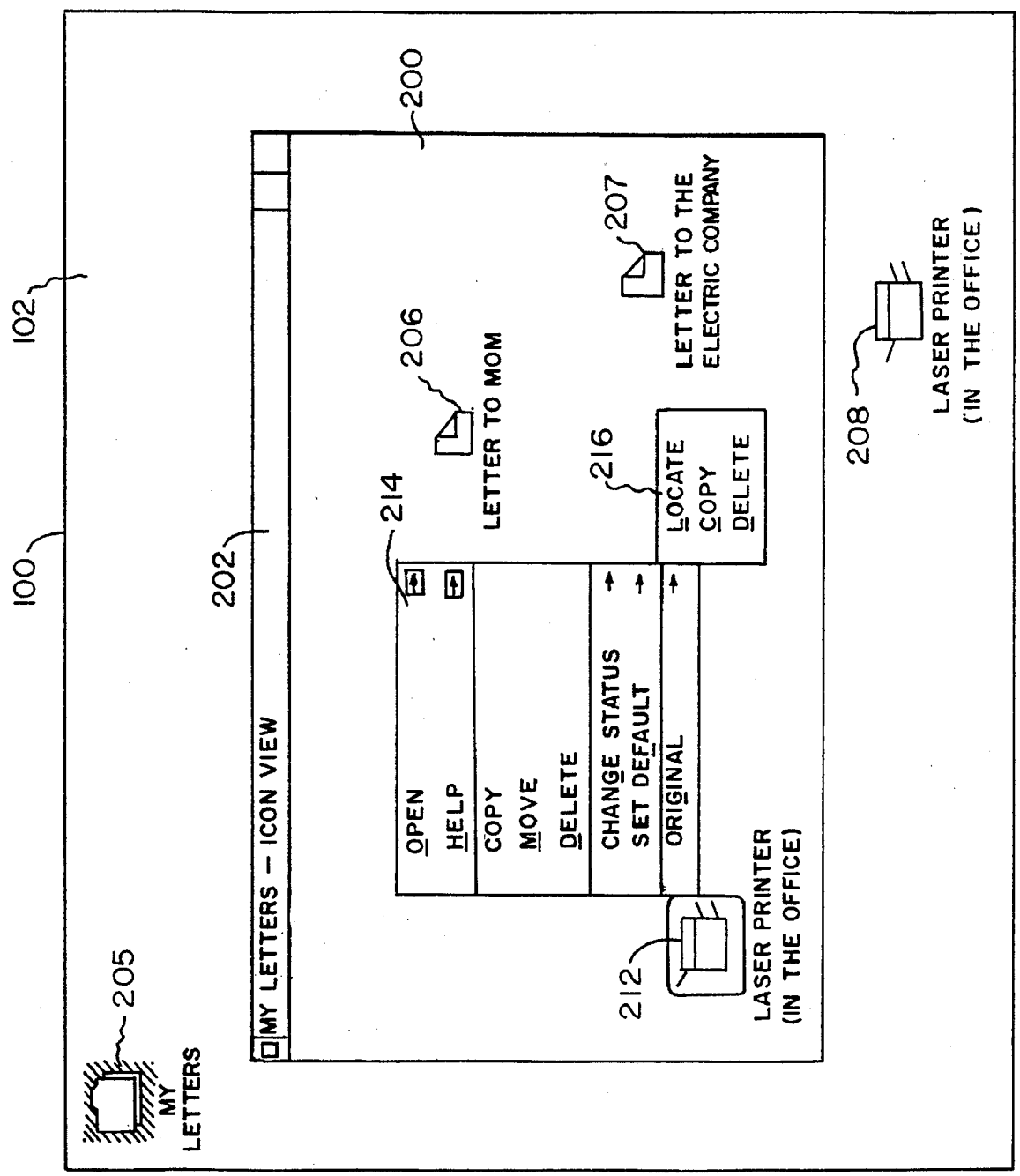
FIG. 6 is a screen representation of the surrogate icon of FIG. 5 and the menu options associated therewith.

For purposes of discussion, it is assumed that the user has located surrogate icon 212 within the folder "My Letters" as illustrated by window 200. In accordance with the present invention, the user can access original icon 208 through surrogate icon 212, by selecting icon 212 and single clicking mouse button 2. FIG. 6 illustrates surrogate icon 212 and its associated cascaded menus 214 and 216 which appear after selecting Burrogate icon 212. The options displayed on menu 214 associated with surrogate icon 212 comprise COPY, MOVE, DELETE, and ORIGINAL, among others, as explained hereinafter.

To the extent that menu 214 and menu 210 display options having similar names, the underlying function of the option is different, except for OPEN and HELP. If the user selects COPY from menu 214, another surrogate icon of the original object will be created, not a copy of the original object icon. If the user selects MOVE, the surrogate icon 212 moves rather than the original object icon 208 as the cursor moves across the graphic user interface. If the user selects DELETE from menu 214, the surrogate icon 212 is deleted, not the original icon 208. In the graphical user interface of the OS/2 Operating System, in which the present invention is implemented, menu 214 includes an additional option "ORIGINAL" which if selected, causes a special cascade menu 216 to appear. Menu 216 includes options which, if selected, allow the user to manipulate the original object from the surrogate icon, as explained hereinafter.

The options displayed in menu 216 comprise LOCATE, COPY and DELETE. A selection of the LOCATE option using the appropriate mouse buttons causes focus to switch from the current folder view to an existing folder view which contains the original object icon, or, if no such folder exists, a new icon view of the folder which contains the original object is opelled. The original object icon is selected and highlighted by the graphical user interface. In this manner, selection of the LOCATE option from menu 216 provides a quick mechanism to navigate from a surrogate icon back to the original object icon. If Copy is selected, using the mouse or other pointer device from menu 216, a copy of the original object data is created, as long as the original object is copyable. Objects which are not copyable cannot be copied. In this matter, a copy of the original object data can be created from any one of the surrogate icons representing the original object. Selection of DELETE from menu 216 causes the original object and all surrogate objects of the original to be deleted or destroyed. This option is only available if the original object is of a deletable object type.

It may be appreciated from the foregoing explanation that the present invention provides a facility by which an original object can be located, copied or deleted from any of a plurality of surrogate objects anywhere in the graphical user interface.

Figure 7:
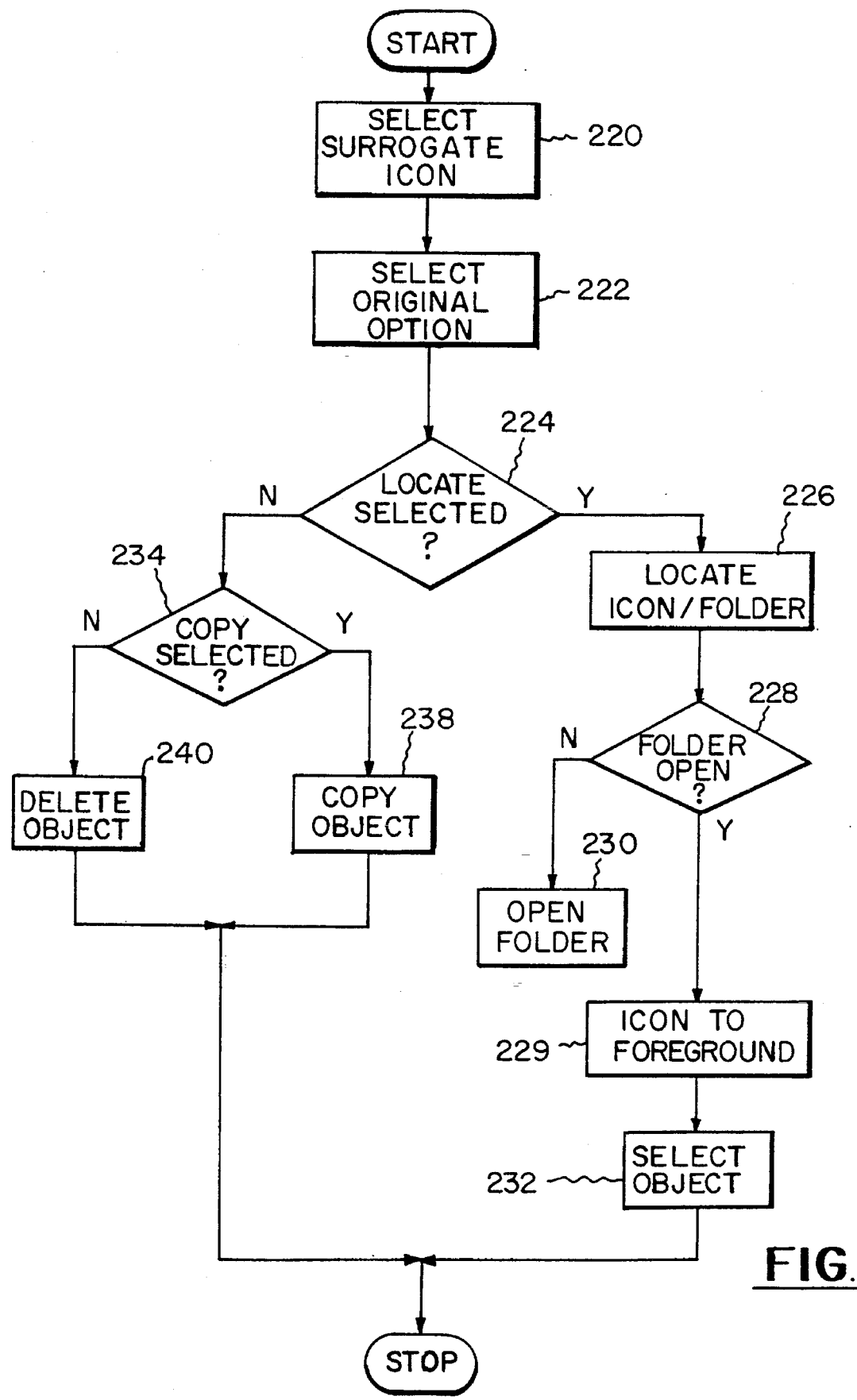
FIG. 7 is a flowchart depicting the method steps of accessing and manipulating the properties of an original object through the surrogate icon menus in accordance with the present invention.

Referring to FIG. 7, the above described procedure is outlined in more detail with reference to the flowchart illustrated therein. First, the user initially selects surrogate icon 212, in a manner previously described, as indicated by procedural step 220. Next, from the menu 214 associated with icon 212, the user selects the ORIGINAL option, as indicated in procedural step 222. Next, the user selects the desired action regarding the original object. If the user selects the LOCATE option, as illustrated in decisional step 224, program flow proceeds to procedural block 226 where the graphic user interface, in conjunction with the operating system, locates the folder or location on the graphic user interface where the original object icon 208 is located. The operating system determines whether or not the folder is opened, as illustrated in decisional step 228. If the folder is open the window representing the folder will be brought to the foreground of the graphic user interface, as illustrated by procedural block 229. If the folder is not open, the operating system will open the folder and bring it to the foreground of the graphic user interface, as designated by procedural block 230. The operating system will then select the original object icon and highlight the object, as indicated in procedural step 232.

If the LOCATE option is not selected, a determination is made as to whether the COPY Option has been selected as indicated by decisional block 234. Upon selection of the COPY command, a copy of the data of the original object is created, including a new icon identical to icon 208, as indicated by procedural block 238. The operating system determines whether or not the original object represented by icon 212 is copyable. If so, the COPY option will appear in menu 216. If the original object is not copyable, this option will appear in menu 216. If, alternatively, the COPY option was not selected, by process of elimination, the DELETE option was selected. Selection of the DELETE option causes the original object to be destroyed as well as any surrogate icons linked to the original object, as indicated by procedural block 240. The operating system determines whether or not the original object represented by icon 212 is deletable, and if so, provides the DELETE option in menu 216, if the object is not deletable, this command will not be present in menu 216.

It can be appreciated from the foregoing descriptions and explanations, that the present invention contemplates a computer system having a graphical user interface by which objects on the computer system are represented by icons and whereby those objects may be manipulated and accessed through surrogate icons which appears visually different from the icons representing the object itself.

Accordingly, it will be appreciated that the detailed disclosure has been presented by way of example only and is not intended to be limiting. Various alterations, modifications and improvements will readily occur to those skilled in the art and may be practiced without departing from the spirit and scope of the invention. The invention is limited only as required by the following claims and equivalents thereto.

What is claimed is:

1. A graphical user interface, executable on a computer system, said graphical user interface comprising:

a user-selectable first icon, displayable on said computer system, said user-selectable first icon representing an object having desired properties;

a user-selectable second icon, displayable on said computer system, said user-selectable second icon having an appearance visually different from said user-selectable first icon, said user-selectable second icon representing said object and having associated therewith at least one user-selectable command, said at least one user-selectable command enabling manipulation of said object properties; and means, responsive to selection of the user-selectable second icon and said at least one user-selectable command, and coupled to said computer system, for manipulating the property of said object, wherein all properties of said object subject to manipulation by said at least one user-selectable command are manipulated in response to selection of user-selectable second icon and said at least one user-selectable command, wherein said at least one user-selectable command includes a location command, wherein said user-selectable first icon in a folder view is displayed and said user-selectable second icon is displayed in a current folder view and wherein said means includes a location means for displaying said user-selectable first icon in the response to selection of said user-selectable second icon in the current folder view and said at least one user-selectable command.

2. A graphical user interface, executable on a computer system, said graphical user interface comprising:

a user-selectable first icon, displayable on said computer system, said user-selectable first icon representing an object having desired properties;

a user-selectable second icon, displayable on said computer system, said second user-selectable icon having an appearance visually different from said user-selectable first icon, said user-selectable second icon representing said object and having associated therewith at least one user-selectable command, said at least one command enabling manipulation of said object properties; and means, responsive to selection of the user-selectable second icon and said at least one user-selectable command, and coupled to said computer system, for manipulating the property of said object, wherein all properties of said object subject to manipulation by said at least one user-selectable command are manipulated in response to selection of second user-selectable icon and said at least one command, wherein said at least one user-selectable command includes a delete command, wherein said first user-selectable and second user-selectable icons are deleted from said graphical user interface by selecting said user-selectable second icon and said command and wherein said means further includes deletion means for deleting said first user-selectable and said second user-selectable icons in response to a selection of said second icon and said at least one user-selectable command.

3. A method of manipulating an object in a graphical user interface, the method comprising the steps of:

providing an object having desired properties on the computer system, wherein one of the desired properties includes a first icon displayable within a first folder view within the graphical user interface to represent the object;

providing at least one user-selectable command, wherein the at least one user-selectable command enables manipulation of the desired properties of the object upon activation of the at least one user selectable command;

creating a seragent icon visually different from the first icon, wherein the seragent icon is displayable within a second folder view within the graphical user interface;

linking the seragent icon with the first icon, wherein the at least one user selectable command is activatable through the seragent icon; and manipulating the desired properties of the object in response to a user selection of the seragent icon, wherein all properties of the object is subject to manipulation by the at least one user-selectable command are manipulated by selection of the seragent icon.

* * * * *

UNITED STATES PATENT AND TRADEMARK OFFICE
CERTIFICATE OF CORRECTION

PATENT NO. : 5,559,948
DATED : September 24, 1996
INVENTOR(S) : Bloomfield et al.

It is certified that error appears in the above-indentified patent and that said Letters Patent is hereby corrected as shown below:

Column 1, line 30: change "Ser. No. 07/855,366" to --Ser. No. 07/853,366--

Signed and Sealed this

Fourteenth Day of January, 1997

Attest:

BRUCE LEHMAN

*Attesting Officer*  *Commissioner of Patents and Trademarks*